United States Patent [19]

Föhl

[11] Patent Number: 4,491,343
[45] Date of Patent: Jan. 1, 1985

[54] INFLECTOR WITH CLAMPING DEVICE FOR A SAFETY BELT IN MOTOR VEHICLES

[75] Inventor: Artur Föhl, Schorndorf, Fed. Rep. of Germany

[73] Assignee: REPA Feinstanzwerk GmbH, Alfdorf, Fed. Rep. of Germany

[21] Appl. No.: 590,125

[22] Filed: Mar. 16, 1984

Related U.S. Application Data

[63] Continuation of Ser. No. 296,167, Aug. 25, 1981, abandoned.

[30] Foreign Application Priority Data

Aug. 26, 1980 [DE] Fed. Rep. of Germany ....... 3032170

[51] Int. Cl.³ .................. B60R 21/10; A62B 35/02
[52] U.S. Cl. .................. 280/801; 280/806; 297/479; 297/483
[58] Field of Search ............... 280/801, 802, 805, 806, 280/808; 297/479, 483

[56] References Cited

U.S. PATENT DOCUMENTS

| | | | |
|---|---|---|---|
| 4,185,791 | 1/1980 | Takada | 280/802 |
| 4,208,770 | 6/1980 | Takada | 280/806 |
| 4,306,735 | 12/1981 | Pfeiffer et al. | 280/808 |
| 4,310,175 | 1/1982 | Pickett | 280/801 |
| 4,310,176 | 1/1982 | Furusawa et al. | 280/801 |
| 4,327,881 | 5/1982 | Fohl | 280/806 |

FOREIGN PATENT DOCUMENTS 0013221  1/1977  Japan ................... 297/479

*Primary Examiner*—Duane A. Reger
*Assistant Examiner*—John A. Carroll
*Attorney, Agent, or Firm*—Yount & Tarolli

[57] ABSTRACT

Deflector device with clamping device for a safety belt in motor vehicles in which the deflector is mounted on slider movable back and forth. The clamping device has a stationary jaw and a space swivelable jaw movable toward the stationary jaw to clamp the belt passing up between the jaws and then over the deflector surface. A spring normally urges the swivelable jaw away from the stationary jaw. An end of slider is disposed adjacent the swivelable jaw such that a belt pull sufficient to overcome the spring force will move the deflector device and attached slide causing the swivelable clamping jaw to swivel and move toward the stationary jaw clamping the belt therebetween.

14 Claims, 3 Drawing Figures

INFLECTOR WITH CLAMPING DEVICE FOR A SAFETY BELT IN MOTOR VEHICLES

This is a continuation of application Ser. No. 296,167 filed Aug. 25, 1981, and now abandoned.

BACKGROUND OF THE INVENTION

1. Field of the Invention

The invention relates to a deflector device with a clamping device wherein a strong belt pull on the safety belt from the deflector device will cause a movable jaw to move towards a fixed jaw of the clamping device and clamp the belt between the jaws.

2. Background of the Invention

A known deflector fitting with clamping device (German Published Non-Prosecuted Application No. 2,540,302) mounted on the vehicular frame above an automatic rollup device, is a dual-armed lever type in which a swivel part is swivelable around a horizontal axis. An upper lever arm of the deflector fitting forms the deflector part having a cambered deflector surface. Its lower lever arm presents a movable clamping jaw, which on an increased pull acting on the belt band, e.g., in case of a crash, followed by locking of the roller of the automatic rollup device presses against the stationary clamping jaw by countering a spring load, and locks and brakes the belt bands. This known concept requires a highly stable design implementation and relatively large vehicular installation space particularly because part of the deflector part is a lever with relatively extensive lever lengths and highly stepped-up leverage forces acting on the swiveling support. Furthermore, in this case the deflector part is not laterally swivelable in the sense of a potential adaptation to various angles of attack of the belt band section extending from the deflector part to the person to be protected.

SUMMARY OF THE INVENTION

An object of the invention is to provide a deflector device with clamping device of the initially described type which is simple in design and can withstand high torques. In case of a torque rise it can insure a complete clamp-off and braking of the belt band, and particularly may be dimensionally reduced to enable its hidden installation behind the vehicle's interior panelling.

With the foregoing and other objects in view, there is provided in accordance with the invention a deflector device with clamping device for a safety belt in motor vehicles, comprising a deflector device having a deflector member with a cambered surface partly wrapped around by the belt, a slider mounted on the vehicle and slideable back and forth, the deflector member mounted on the slider and slideable therewith, a clamping device having a stationary clamping jaw normally spaced from a swivelable clamping jaw to permit the belt passing therebetween to move freely to the deflector member, spring means urging the swivelable clamping jaw away from the stationary clamping jaw, said slider disposed adjacent the swivelable clamping jaw whereby an increased belt pull be sufficient to overcome the urging of the spring will move the deflector member and attached slider causing the swivelable clamping jaw to swivel and move toward the stationary jaw clamping the belt therebetween.

Other features which are considered as characteristic for the invention are set forth in the appended claims.

Although the invention is illustrated and described herein as embodied in a deflector device with clamping device for a safety belt in motor vehicles, it is nevertheless not intended to be limited to the details shown, since various modifications may be made therein be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
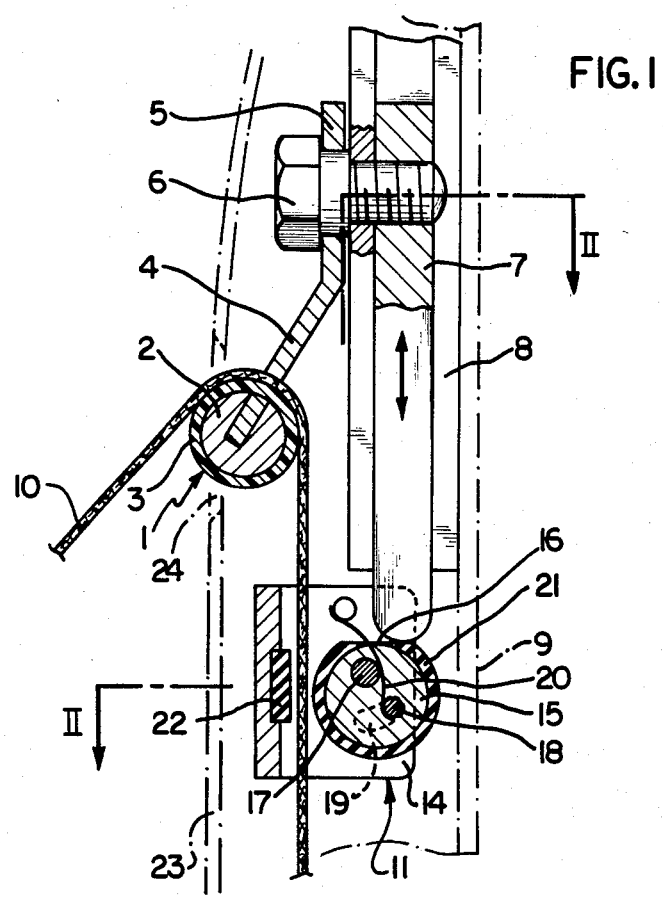
FIG. 1 diagrammatically illustrates the invention in a sectional view taken along line I—I of FIG. 2 showing a sliding guide mounted on the vehicle, a plate type slider movable within the guide, a deflector device having a deflector fitting with a deflector plate mounted on the slider and slideable therewith, and a deflector cross piece with a deflector surface over which the safety belt passes. A clamping device beneath the deflector device has a U-shaped fitting with a stationary jaw and a spaced swivelable jaw between which the belt passes to the deflector member. The stationary jaw is fixedly mounted on the swivelable jaw eccentrically mounted on the U-shaped fitting such that swiveling of the swivelable jaw will clamp the belt between it and the stationary jaw. The slider is disposed adjacent a flattened surface of the swivelable jaw. A spring urges the swiveling jaw away from the stationary jaw. A strong pull on the belt sufficient to overcome the spring force pulls the deflector down and with it the attached slider which moves against the flattened surface of the swivelable jaw causing it to swivel and move against the fixed jaw and clamp the belt.

The combination of a deflector member with a cambered deflector surface on which the belt band is deflected and on which high torques act in a well-known way, together with a slider on which it is mounted and stably supported in vehicular-fixed sliding guides, give a spatially compact design. Furthermore, a long-stretched out design of minimal depth is produced by the slide's longitudinal shifting capability and its special functional coupling with the movable part of the clamping device, which makes it feasible to hide the arrangement on or in frame vehicular supports and cover it with a panel.

An improvement in the compact design is obtained by employing as the movable clamping jaw an eccentrically supported, flattened roller, which can be very cheaply manufactured.

The invention is described below with references to an exemplified embodiment shown in the drawings.

Figure 2:
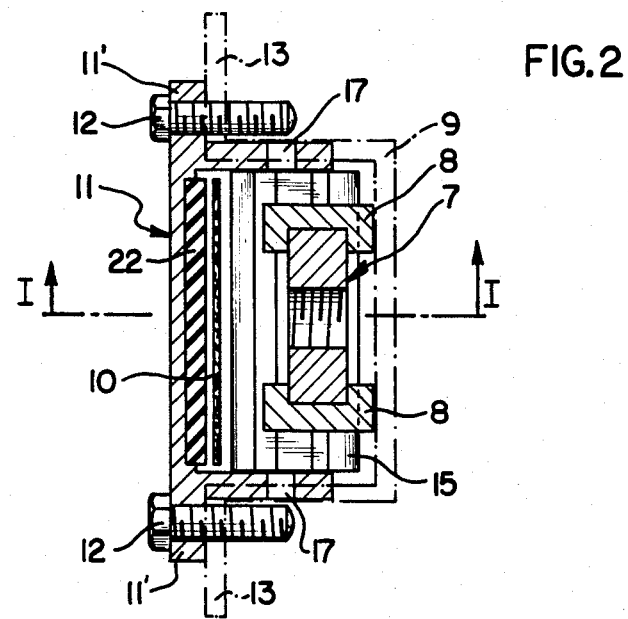
FIG. 2 is a sectional view taken along line II—II of FIG. 1.
Figure 3:
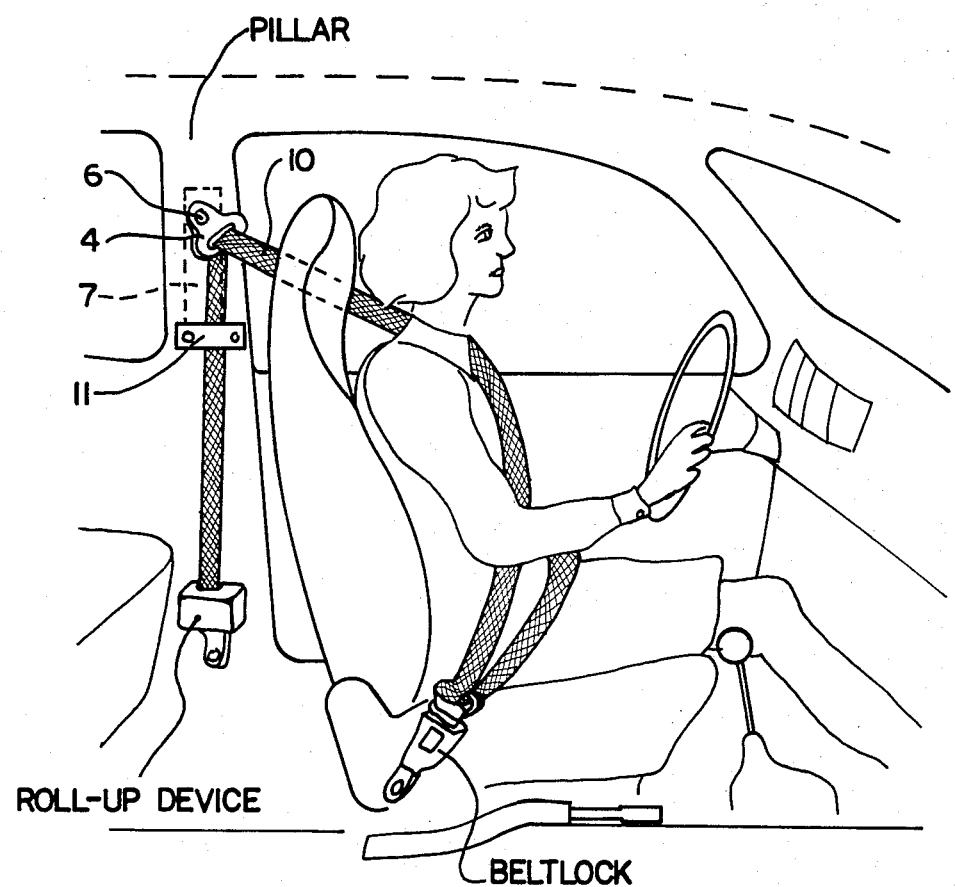
FIG. 3 diagrammatically illustrates a deflecting and restraint system for deflecting a safety belt extending toward and passing over a seated occupant combined with restraining the seated occupant from moving away from the seat upon a sudden change in acceleration of the vehicle. The safety belt has one end attached to an automatic roll-up device mounted on the vehicle and the other end passed over the seated occupant and then detachably connected to a belt lock. A deflector device has its deflector member partly wrapped around by the belt. The deflector member is mounted on a slider and upon an increased belt pull due to sudden change in acceleration of the motor vehicle, will cause clamping of the belt in a clamping device.

The deflector fitting with clamping device shown in FIGS. 1 and 2 in vertical and lateral sections has a deflector part 1 with sleeve 3 on a roller type foundation 2, rigidly mounted in a known manner to the free end of a deflector cross-piece 4. A slightly angled section 5 of deflector cross-piece 4 is swivelably mounted on a plate type slider 7 by means of a screw 6, with opposing slider edges longitudinal-slideably carried in an arrow-marked direction in sliding guides 8. The latter are mounted by welding, screws or similar means on a vehicular frame support 9, indicated by a broken line, having a trough-like shape. Sleeve 3 is partially looped around by belt band 10 of a safety belt as shown in the vertical section of FIG. 1. The belt is fed to a conventional automatic rollup device mounted on the vehicle, and in the automatic rollup device, the rollup roller is blocked in case of accident exerting a strong pull on the belt. The other end of the belt is passed over the seat occupant and then detachably connected to a belt lock. Beneath slider 7 a U-shaped fitting 11 with lateral projections 11' is mounted on external support flanges 13 by means of engaging screws 12. A roller shaped clamping jaw 15 is swivelably supported on sidewalls 14 of fitting 11 by bearing pins 17, which are inserted in the roller front ends eccentrically to the roller axis. The generally round roller shape of clamping jaw 15 has a flattened portion 16, on which the bottom rounded end of slider 7 is so supported that a lever arm remains between swivel axis (bearing pins 17) and the support point. On one front end the clamping jaw 15 has a stop pin 18, which is in a swivel limiting way guided in a cambered slot 19 of sidewall 14. The end of stop pin 18 projecting from the sidewall forms an abutment for a spring 20, which is further supported on elongated bearing pin 17 and is prestress-supported by the stop pin 18. Spring 20 pushes clamping jaw 15 into the shown floating position, wherein a gap remains between clamping jaw 15 having an elastic, nonskid coating 21, e.g., a rubber covering, and a stationary, mounted, equally elastic clamping piece 22. The belt band 10 is freely movable between the two jaws. A covering designated as 23 is placed over support 9 and that way hides the described device. It has a passage 24 for the belt band 10.

For normal motions of belt band 10 the spring load 20 is sufficient to keep clamping jaw 15, slider 7, and deflector part 11 in the shown idle and floating position. On elevated torques acting on the slanted-off belt band section, and on blocking of the automatic rollup device, deflector part 11 and attached slider 7 are shifted downward so that the slider end swivels clamping jaw 15 around the swivel axis at point 17. Belt band 10 at its vertical section is interlocked by jaw 15 moving against stationary clamping jaw 22 and the belt immediately braked. This mechanically relieves the automatic rollup device which means that it can be of lightweight design. Upon suspension of the strong pull of the belt, spring 20 pushes clamping jaw 15 and slider 7 back into the floating upper position.

There are claimed:

1. An apparatus for use in a motor vehicle to clamp a safety belt, said apparatus comprising a stationary clamp member, a movable clamp member which cooperates with said stationary clamp member to define space through which the belt passes, a movable slide member, a deflector member connected to said slide member and having a surface across which the safety belt extends between said deflector and slide members, said movable clamp member being movable toward said stationary clamp member by said slide member under the influence of force applied against said deflector member by the belt to thereby clamp the belt between said movable and stationary clamp members.

2. An apparatus as set forth in claim 1 wherein said movable clamp member is a roller which is supported for pivotal movement about an axis which is offset from a central axis of said roller, said slide member being engageable with said roller to pivot said roller about the offset axis.

3. An apparatus as set forth in claim 1 further including means for supporting said movable clamp member for pivotal movement toward and away from said stationary clamp member, said stationary clamp member being disposed on a first side of an axis about which said movable clamp member pivots, said slide member being disposed in engagement with said movable clamp member at a location which is disposed on a second side of the axis about which said movable clamp member pivots to enable said slide member to apply force against said movable clamp member to pivot said movable clamp member toward said stationary clamp member.

4. An apparatus as set forth in claim 1 wherein said movable clamp member is a roller which is supported for pivotal movement about an axis which is offset from a central axis of said roller, said apparatus further including track means for guiding movement of said slide member along a linear path disposed to one side of the axis about which said roller pivots.

5. An apparatus as set forth in claim 1 further including a support member for connecting said deflector member with said slide member.

6. An apparatus for use in a motor vehicle to clamp a safety belt, said apparatus comprising a clamp member, a roller having an outer side surface which cooperates with said clamp member to define a space through which the belt passes, means for supporting said roller for pivotal movement about an axis which is offset form the central axis of the roller, spring means for biasing said roller to a retracted position spaced from said clamp member, a movable slide member, a deflector member connected with said slide member and having a surface across which the belt extends, track means for guiding movement of said slide member toward said roller under the influence of force applied to said deflector member by the belt, said roller being pivotal about its offset axis against the influence of said spring means by movement of said slide member along said track means toward said roller to thereby clamp the belt between said roller and clamp member.

7. An apparatus as set forth in claim 6 wherein said slide member has surface means for engaging said roller and applying force against said roller to pivot said roller about its offset axis.

8. An apparatus for clamping a safety belt which extends toward and passes over an occupant seated in a vehicle to restrain the occupant from moving away from the seat upon a sudden change in acceleration of the vehicle, comprising a safety belt extending across an occupant of the vehicle and having one end attached to an automatic roll-up device mounted on the vehicle and the other end detachably connected to a belt lock, a deflector device having a deflector member with a cambered surface which is partly wrapped around by said belt, a slider mounted on the vehicle and slideable back and forth, said deflector member being mounted on said slider and slideable therewith, a clamping device having a stationary clamping jaw normally spaced from a swivelable clamping jaw to permit said belt to pass therebetween and to move freely relative to said deflector member, spring means urging said swivelable clamping jaw away from said stationary clamping jaw, said slider being disposed adjacent said swivelable clamping jaw, said slider and connector member being movable upon an increase in belt pull sufficient to overcome said urging of the spring means to cause the swivelable clamping jaw to swivel and move toward the stationary clamping jaw to clamp the belt between said stationary and movable clamping jaws.

9. An apparatus as set forth in claim 8 wherein the swivelable clamping jaw is a cylindrical roller having a flattened portion, which roller is swivelably supported eccentrically to the roller and wherein said slider is adjacent said flattened portion.

10. An apparatus as set forth in claim 9 wherein said roller clamping jaw is supported in a fitting having a base plate and two legs, and wherein one leg has a slot with a stop pin, extending into the roller to limit the swiveling movement of the roller, and wherein said stop pin forms an abutment for said spring urging said roller jaw away from said stationary jaw.

11. An apparatus as set forth in claim 10 wherein said stationary clamping jaw is a clamping piece mounted on said base plate of the fitting.

12. An apparatus as set forth in claim 11 wherein at least one of the swivelable clamping jaw and stationary clamping jaw has an elastic, nonskid clamping surface.

13. An apparatus according to claim 8 wherein said slider with deflector device, and said clamping device mounted one beneath the other are supported in a sliding guide fixed to the vehicle.

14. An apparatus according to claim 13, wherein said slider with deflector device and clamping device are hidden behind a vehicular panelling with an opening to permit the passage of said belt.

* * * * *

UNITED STATES PATENT AND TRADEMARK OFFICE
CERTIFICATE OF CORRECTION

PATENT NO.   :   4,491,343
DATED        :   January 1, 1985
INVENTOR(S)  :   Artur Fohl It is certified that error appears in the above-identified patent and that said Letters Patent is hereby corrected as shown below:

In the title of the patent change "Inflector" to
-- Deflector Fitting --.

Signed and Sealed this

Twenty-seventh Day of August 1985

[SEAL]

Attest:

DONALD J. QUIGG

Attesting Officer      Acting Commissioner of Patents and Trademarks